US00RE38216E

(19) United States
(12) Reissued Patent
Morrow et al.

(10) Patent Number: US RE38,216 E
(45) Date of Reissued Patent: Aug. 12, 2003

(54) SCOOPED LACROSSE HEAD

(75) Inventors: David Morrow, Farmington Hills, MI (US); Philip Naumburg, Loveland, CO (US)

(73) Assignee: Warrior Lacrosse, Inc., Warren, MI (US)

( * ) Notice: This patent issued on a continued prosecution application filed under 37 CFR 1.53(d), and is subject to the twenty year patent term provisions of 35 U.S.C. 154(a)(2).

(21) Appl. No.: 09/174,804

(22) Filed: Oct. 19, 1998

Related U.S. Patent Documents

Reissue of:
(64) Patent No.: 5,568,925
Issued: Oct. 29, 1996
Appl. No.: 08/516,791
Filed: Aug. 18, 1995

(51) Int. Cl.[7] ..... A63B 59/02; A63B 65/12
(52) U.S. Cl. ..... 473/513
(58) Field of Search ..... 473/513

(56) References Cited

U.S. PATENT DOCUMENTS

| | | | | | |
|---|---|---|---|---|---|
| 1,459,389 | A | | 6/1923 | Brown | |
| 3,507,495 | A | * | 4/1970 | Tucker | 473/513 |
| 3,822,062 | A | * | 7/1974 | Tucker et al. | 273/326 |
| 4,034,984 | A | * | 7/1977 | Crawford et al. | 273/326 |
| 4,138,111 | A | * | 2/1979 | Rule | 273/96 |
| D273,601 | S | | 4/1984 | Lewis, Jr. et al. | |
| 4,657,260 | A | * | 4/1987 | Brine | 273/326 |
| D297,963 | S | | 10/1988 | Tucker et al. | |
| 4,940,243 | A | * | 7/1990 | Tucker et al. | 273/326 |
| D318,509 | S | * | 7/1991 | Naumburg, Jr. | D21/211 |
| 5,037,112 | A | * | 8/1991 | Brine et al. | 273/326 |
| 5,048,843 | A | | 9/1991 | Dorfi et al. | |
| 5,054,790 | A | | 10/1991 | Brine, III et al. | |
| 5,067,726 | A | * | 11/1991 | Brine, III et al. | 473/513 |
| 5,080,372 | A | | 1/1992 | Brine, III et al. | |
| D331,086 | S | | 11/1992 | Brine, III et al. | |
| 5,290,039 | A | * | 3/1994 | Cornellio | 473/513 |
| 5,494,297 | A | * | 2/1996 | MacNeil | 273/326 |
| 5,568,925 | A | * | 10/1996 | Morrow et al. | 473/513 |
| D376,183 | S | * | 12/1996 | Morrow et al. | D21/724 |
| 5,651,549 | A | * | 7/1997 | Dill et al. | 473/513 |

FOREIGN PATENT DOCUMENTS

CA 1273662 9/1990

OTHER PUBLICATIONS

STX Sales Literature "Raptor" Lacrosse Head (Apr. 1995).*
Brine Inc. Sales Literature "Get The Edge" (1995).*
Committee Meeting Minutes—May 15, 1983—Hall of Fame.
Get the Edge sales literature, Sep. 22, 1995.*
Victory Crosse Sales Literature (date and status as a "publication" unknown).
Lacrosse Magazine, Jun. 1994.

* cited by examiner

*Primary Examiner*—Paul T. Sewell
*Assistant Examiner*—M. Chambers
(74) *Attorney, Agent, or Firm*—Artz & Artz, P.C.

(57) ABSTRACT

A lacrosse head having an open frame with sidewalk that curve continuously from the base to the lip of the frame so as to define a curved scoop-like frame geometry when viewed in side elevation. The frame base has an angulated ball rest surface and a shoulder recessed therefrom at which a net is attached to the base. The lip that interconnects the frame sidewalls remote from the base has an outside surface angle that cooperates with the scoop-like geometry of the sidewalls to enhance control of ground balls. The overall scoop-like construction of the head frame provides improved feel during play, and enhanced ball control and pass/shot velocity. The recessed base shoulder, particularly when combined with the angulated ball-rest surface, protects the net attachment knots from abrasion, and also improves ball control during one-handed vertical cradling.

101 Claims, 5 Drawing Sheets

SCOOPED LACROSSE HEAD

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a continuation-in-part of Applicants' patent application, Ser. No. 038,329, which was filed May 3, 1995 and issued as Design Pat. No. D376,183, entitled "LACROSSE HEAD."*

The present invention relates to lacrosse sticks, and more particularly to a lacrosse stick head having a curved or scooped configuration and other improvements that facilitate play.

BACKGROUND AND SUMMARY OF THE INVENTION

Lacrosse heads of current design typically take the form of an open frame having a base with a concave interior surface that defines a ball rest, a pair of sidewalls that diverge form the base, and a lip that interconnects the sidewalls remotely of the base. Openings or other means are carried by the frame for securing a lacrosse net around the back side of the frame, leaving the opposing front side of the frame open for receiving lacrosse balls. A socket or other means exteriorly projects from the base of the frame for attachment to a handle. The handle and attachment socket define a handle/head axis, which typically although not necessarily forms the central axis and/or an axis of lateral symmetry of the head. All or at least a major portion of the front side of the head is conventionally disposed in a plane parallel to the handle/head axis.

Although lacrosse heads of the described character have enjoyed substantial acceptance and success in the marketplace, improvements remain desirable. It is a general object of the present invention to provide a lacrosse head of the described character that possesses a radically new curved scoop-like design that greatly facilitates play and gives players a decided advantage as compared with heads of conventional construction. Another and more specific object of the present invention is to provide a lacrosse head of the described character that is particularly designed and configured to enable players to dominate ground balls. A further object of the present invention is to provide a lacrosse head of the described character that is specifically designed to direct a lacrosse ball to the pocket or "sweet spot" of the head, and to improve player control during one-handed cradling of the ball at the ball rest. Another object of the present invention is to provide a lacrosse head that improves both player "feel" and ball velocity during cradling, passing or shooting. Yet another object of the present invention is to provide a lacrosse head that incorporates one or more of the aforementioned objectives and advantages while at the same time being entirely within NCAA and ocher applicable regulations and specifications.

A lacrosse head in accordance with a first aspect or feature of the present invention comprises an open frame construction of the general character described above in which the front side of the frame at the base, adjacent to the socket or other means for attachment to the handle, defines a base plane parallel to the head/handle axis. However, contrary to conventional designs, neither the front sides nor the back sides of the frame sidewalls lie in or are parallel to such base plane. Rather, bath the front sides and the back sides of the frame sidewalls curve away from the base plane in the direction of the frame back side from the base toward the lip, and then back toward the base plane so as to impart a curved scoop-like geometry to the head when viewed in side elevation. In the preferred embodiment of the invention, both the front side and the back aide of the head have maximum spacing or distance from the base plane at about the midpoint of the sidewalls between the base and the lip.

Both the front sides and the back sides of the frame sidewalls curve at substantially constant radii throughout at least one-half of their lengths, and preferably throughout about three-quarters of their lengths, between the base and the lip. Curvature of the sidewalls and lengths of the sidewalls are such that the back sides of the sidewalls return at the lip to a spacing or distance from the base plane equal to or less than spacing of such back side from the plane adjacent to the base. The sidewalls of the lacrosse head in the preferred embodiment of the invention have a substantially constant thickness, measured in a direction perpendicular to the base plane, throughout at least one-half of their lengths, and preferably throughout at least about three-quarters of their lengths, between the base and the lip.

The scooped lacrosse head embodying this first feature or aspect of the invention possesses numerous advantages over conventional head constructions in which the front side of the frame is disposed essentially or entirely in a plane. The curved sidewalls of the present invention naturally channel the lacrosse ball into the "sweet spot" or pocket of the net. Further, the net pocket may be of deeper construction than with conventional heads, while maintaining a sidewall thickness of no more than two inches as required by applicable NCAA specifications. Moreover, the arched scoop-like construction of the head, and the consequent scooped construction of the net attached to the head, provides a greater distance for the ball to travel in the net during a throwing motion, thereby improving both ball speed and "feet" again while maintaining an overall head length within applicable NCAA specifications.

In accordance with another important feature of the present invention, which may be employed either separately from or more preferably in combination wish other aspects of the invention, the lip that interconnects tire head sidewalls remotely of the frame base has an exterior surface—i.e., a surface remote from the ball stop at the frame base—that defines a ground contact plane—i.e., a plane of contact with the ground (assuming that the ground is flat) at the centerline of the head-at an angle of at least 40° to the head/handle axis. That is, when the forward outside surface of the lip is held flat against the ground to scoop a ball, the handle is at an angle of at least 40° to the ground. This exterior lip surface angle, particularly when combined with the preferred scoop-like configuration of the head as discussed above, greatly facilitates control of ground balls because the stick and head may be held at a natural angle for retrieving ground balls while the front lip is scooped beneath the ball without interrupting play or player motion. Further, the geometry of the head, coupled with the preferred molded nylon construction of the head, allows the head to flex so as to improve contact between the lip and ground during use, yielding even greater ground contact and ground ball dominance.

In accordance with a third important aspect of the present invention, which again may he implemented either separately from or more preferably in combination wish other aspects of the invention, the base of the frame that defines the ball rest has a concave shoulder at the back side of the base that is recessed with respect to the concave interior surface of the base, with the net-securing apertures or other means at the base being disposed in such shoulder. This shoulder provides two distinct advantages over conventional ball rest constructions. First, the knots or other means that secure the net to the frame are recessed by the shoulder beneath the ball rest, and beneath the foam robber ball stop that is conventionally secured to the ball rest. Thus, the net-securing knots at the frame base are not abraded by balls that abut or are carried on the ball rest and ball step. Second, the recessed shoulder allows the ball to rest within the net pocket at a position below the arcuate plane of the ball rest when the head is held perpendicular to the ground. This feature provides improved ball control for one-handed cradling, while remaining within applicable NCAA regulations which require that the ball fall freely from the head when the head is held in inverted horizontal orientation. In the preferred embodiment of the invention, the arcuate ball-rest surface is on a conical surface of revolution at an angle of 91° to the head/handle axis, which further enhances the natural action of the head to hold the ball against the net during one-handed vertical cradling.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
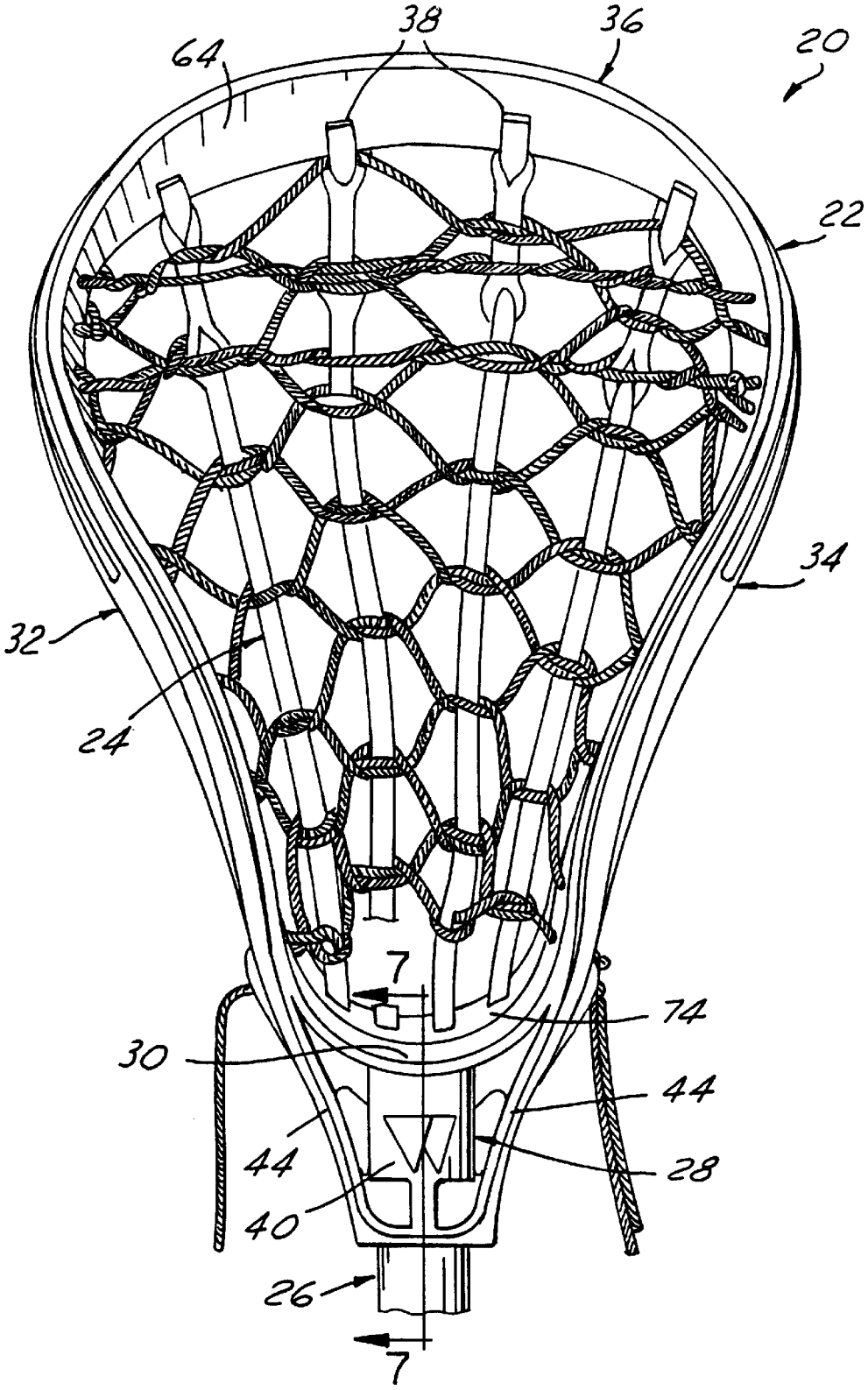
FIG. 1 is a top plan view of a lacrosse stick incorporating an improved head in accordance with a presently preferred embodiment of the invention.
Figure 2:
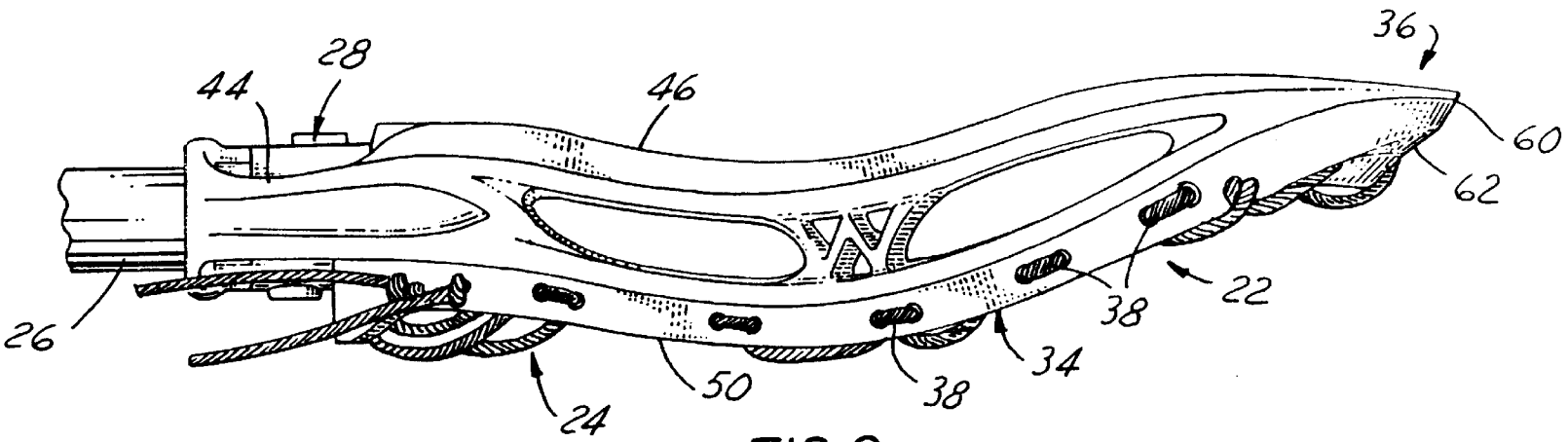
FIG. 2 is a side elevational view of the lacrosse stick illustrated in FIG. 1.
Figure 3:
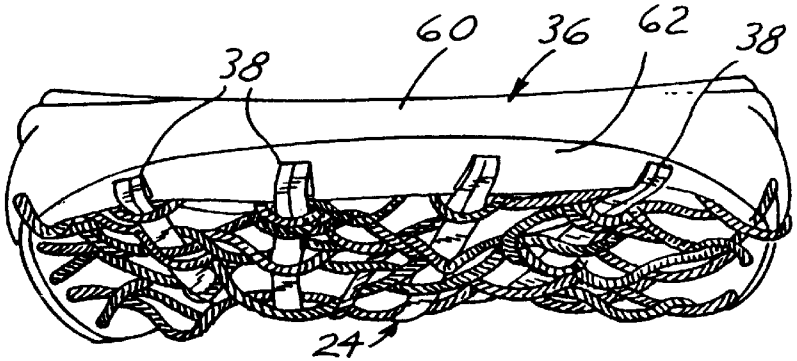
FIG. 3 is an end elevational view of the lacrosse stick illustrated in FIGS. 1 and 2.
Figure 4:
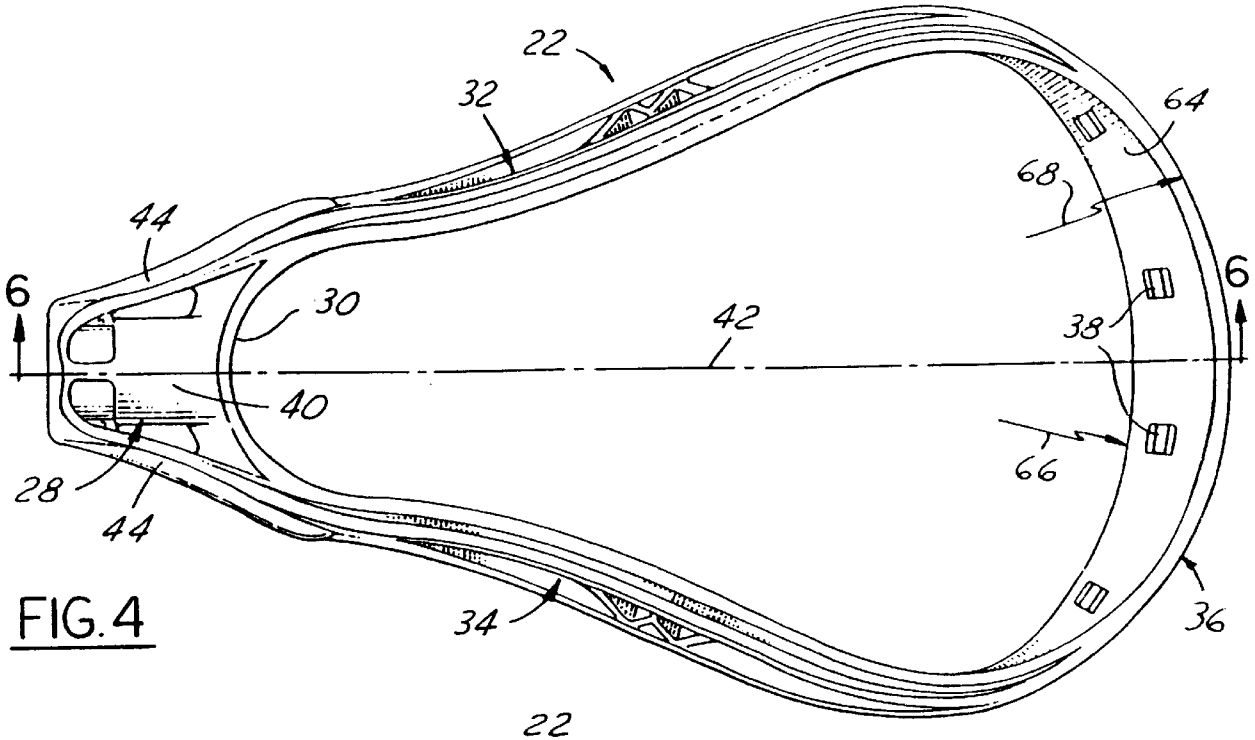
FIG. 4 is a plan view of a lacrosse head in accordance with a presently preferred embodiment of the invention.
Figure 5:
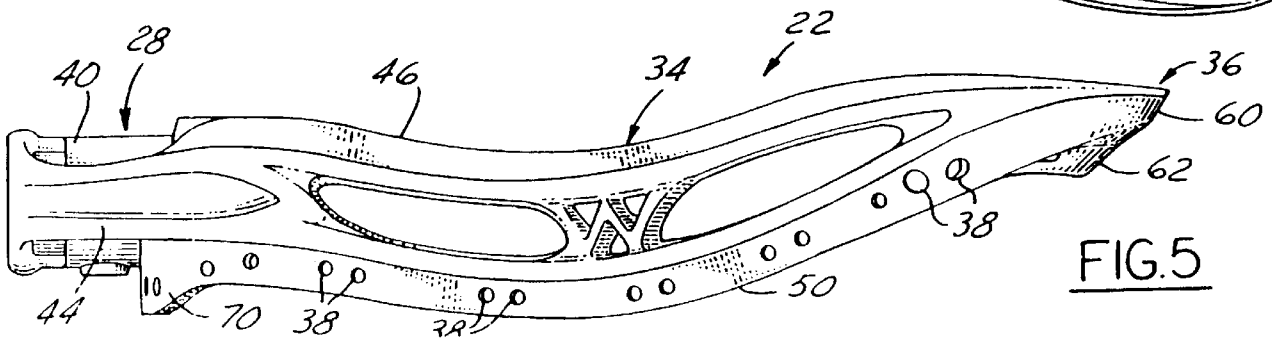
FIG. 5 is a side elevational view of the lacrosse head illustrated in FIG. 4.

FIGS. 1–3 illustrate a lacrosse stick 20 that includes a head 22 in accordance with a presently preferred embodiment of the present invention having a net or pocket 24 secured thereto. The head and net subassembly is in turn secured to a handle 26, which is preferably of hollow titanium construction having a cross section in the form of an irregular octagon. Net 24 may be of any suitable type, such as that disclosed in U.S. Pat. No. D318,509.

Head 22 (FIGS. 1–6) preferably comprises an open one-piece frame of monolithic injection-molded plastic composition such as nylon. Nylon 66 is currently preferred. Head frame 22 has a base 28 with a concave interior surface 30 that defines a ball rest. A pair of sidewalk 32, 34 diverge from base 28, and are interconnected by an arcuate lip 36 at the ends thereof remote from base 28. Sidewalls 32, 34 are of diverging hourglass-like construction in plan view (FIGS. 1 and 4), being interiorly convex for about one-half of their lengths adjacent to base 28, and interiorly concave for about one-half of their lengths adjacent to lip 36. A series of apertures 38 is disposed entirely around frame 22 along a back side thereof for securing net 24 to frame 22. A socket 40 exteriorly projects from frame base 28 for receiving handle 26 (FIGS. 1–2 and 7) and securing head 22 to handle 26 by means of a screw 41 (FIG. 7) or other suitable means. Handle 26 and socket 40 thus define a handle/head axis 42 (FIGS. 4, 6, 7 and 10). In the illustrated embodiment of the invention, axis 42 defines the lateral centerline and the lateral axis of symmetry between the opposing sides of the head, which is to say that sidewalk 32, 34 arc mirror images of each other, as are the laterally opposed portions of lip 36 and base 28. A pair of ribs 44 integrally extend from associated sidewalk 32, 34 to the end of socket 40 remote from base 2B for strengthening the socket/frame interconnection.

The front side edge 46 of that portion of base 28 immediately adjacent to socket 40 defines a plane 48 (FIG. 6) that is offset from but parallel to handle/head axis 42. As noted above, lacrosse handles of conventional construction typically have all or a major portion of frame front side edge 46 disposed in plane 4. However, contrary to such conventional constructions, head 22 of the present invention incorporates both a front side edge 46 and a back side edge 50 that curve between base 28 and lip 36 first away from plane 48 in the direction of back side edge 50, and then back toward plane 48. Front side edge 46 crosses plane 48 at 56, and then reverses curvature toward lip 36. Back edge 50 is convex (as viewed in FIG. 6) until blending with lip 36. Thus, edges 46, 50 taper toward each other and merge into lip 36. Both sidewalk 32, 34 one preferably of uniform thickness 52 for at least one-half, and preferably about three-quarters, of their respective lengths. Thickness 52 preferably is not more than two inches, as required by applicable NCAA specifications. In the region of such uniform thickness 52, front side edges 46 of sidewalk 32, 34 have a radius of curvature 54 (FIG. 6) of about 9.86 inches. After front side edge 46 crosses plane 48 at about point 56 (FIG. 6), front side edge 46 has a reverse radius of curvature 58 of about 5.05 inches. From about such crossing of front side edge 46 of plane 48 at point 56, thickness of sidewalk 32, 34 decreases uniformly to a minimum thickness at lip 36.

Figure 10:
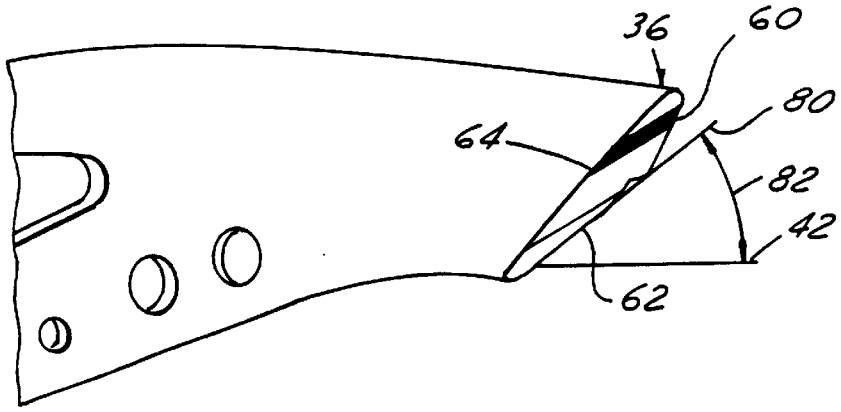
FIG. 10 is a fragmentary view on an enlarged scale of a portion of the head as illustrated in FIG. 6.

At lip 36 (FIGS. 6 and 10) there are defined a front lip outside surface 60, a back lip outside surface 62 at an angle to surface 60, and an inside lip surface 64 that is smooth and continuous from front to back and side to side of lip 36. As shown in FIG. 10, surfaces 60, 62 define at the centerline of the head a ground contact plane 80. This plane 80 is the plane of contact of lip 36 with the ground (assuming that the ground is flat) when the lip is held flat against the ground to scoop a ball. In accordance with this feature of the invention, the angle 82 (FIG. 10) between plane 80 and head/handle axis 42, and thus the angle of the handle to the ground during scooping, is at least 40°, but not more than 65°. The presently preferred angle 82 is 45°. The angle of surface 60 with respect to axis 42 in the preferred embodiment of the invention is around 60°, and the angle of surface 62 with respect to axis 42 is around 45°. These surfaces are angled with respect to each other to provide a slightly thickened exterior rib around the lip for added strength. The angle of surface 64 with respect to axis 42 is at least 40°, and preferably about 47°. The inside edge of lip 36 has a uniform radius of curvature 66 (FIG. 4) of about 5.7 inches in the preferred embodiment of the invention, and the outside edge of lip 36 has a uniform radius of curvature 68 of about 4.2 inches.

Figure 6:
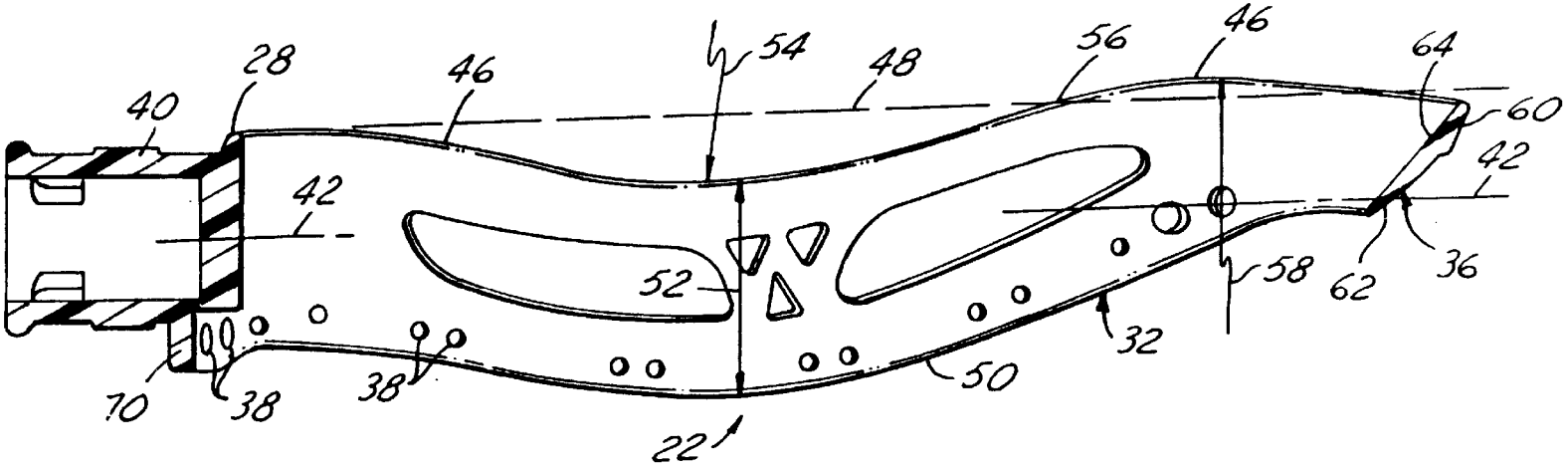
FIG. 6 is a sectional view the lacrosse head taken substantially along the line 6—6 in FIG. 4.
Figure 7:
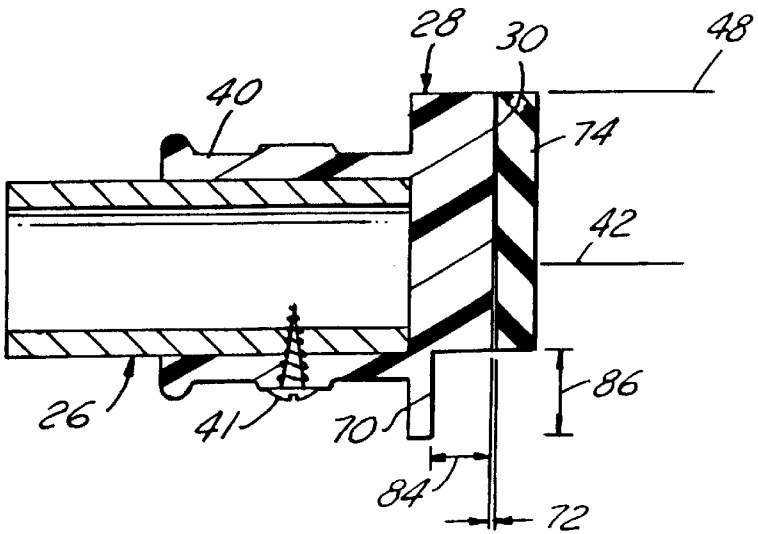
FIG. 7 is a fragmentary sectional view taken substantially along the line 7—7 in FIG. 1.
Figure 8:
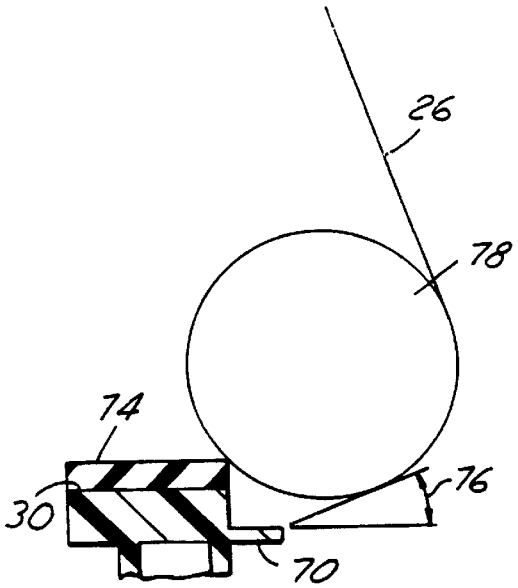
FIGS. 8 and 9 are schematic views similar to that of FIG. 7 that illustrate one feature of the present invention.
Figure 9:
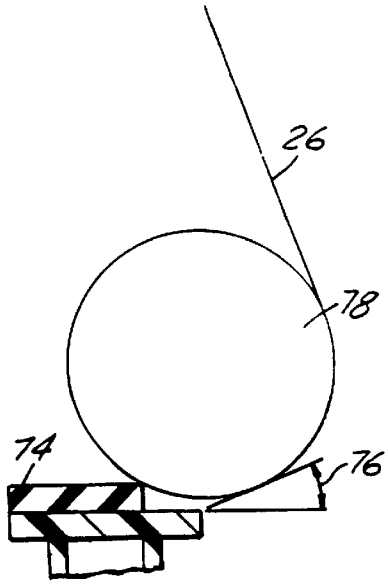
(PRIOR ART) FIG.9

Base 28 of frame 24 has a concave shoulder 70 at the back side thereof, which is recessed with respect to base ball-rest surface 30. As best seen in FIG. 6, net attachment apertures 38 at base 28 are disposed in recessed shoulder 70. In this way the net strings and knots are recessed below surface 30, and are protected from abutment and abrasion by the lacrosse balls. Surface 30 is at a 1° back angle 72 (FIG. 7) with respect to perpendicular to axis 42, which is to say that surface 30 is at an angle of 91° with respect to axis 42. In assembly, a bail-stop pad 74 (FIGS. 1 and 7) of foam rubber or the like is secured to ball-rest surface 30. In addition to protecting the net from abrasion as described above, recessed shoulder 70, particularly combined with taper angle 72, greatly facilitates ball control during one-handed cradling. As shown in FIG. 8, for a given net pocket angle 76, recessed shoulder 70 allows the lacrosse ball 78 to nest more deeply in the pocket of net 26 than in the ease of prior art constructions of the type illustrated in FIG. 9 without the recessed shoulder. In the preferred embodiment of the invention illustrated in the drawings, shoulder 70 is recessed S4 (in a direction parallel to axis 42) approximately 0.25 inches (0.25 plus or minus 0.04 inches) from ball-rest surface 30. Width 86 of shoulder 70 is preferably about 0.5 inches (+0.0,−0.01 inches), with the total thickness of the head including shoulder 70 being not more than two inches.

We claim:

1. A lacrosse head that comprises:

an open Frame having a base with a concave interior surface defining a ball rest, a pair of sidewalk diverging from said base and a lip interconnecting said sidewalk remotely of said base, means carried by said frame for securing a lacrosse net along a back side of said frame, leaving an opposing front side of said frame open for receiving lacrosse balls, and means exteriorly projecting from said base for attachment of a handle so as to define a handle/head axis, said front side of said frame at said base adjacent to said attachment means defining a plane parallel to said axis, both said front side and said back side of said sidewalks curving away from said plane and then back toward said plane from said base toward said lip so as to impart a curved scoop-like geometry to said head when viewed in side elevation.

2. The head set forth in claim 1 wherein both said front side and said back aide of said sidewalk have a maximum spacing from said plane at about the midpoint of said sidewalk between said base and said lip.

3. The head set forth in claim 2 wherein said front side and said beck side of said sidewalk each curve at substantially constant radius throughout at least one-half of their lengths between said base and said lip.

4. The head set forth in claim 3 wherein curvature of said sidewalk and length of said sidewalk are such that said back sides of said sidewalk return at said lip to a spacing from said plane equal to or less than spacing of said back sides from said plane adjacent to said base.

5. The head set forth in claim 4 wherein thickness of said sidewalls between said front and back sides thereof does not exceed two inches.

6. The head set forth in claim 3 wherein said substantially constant radius is about 9.86 inches.

7. The head set forth in claim 3 wherein said sidewalk arc of uniform thickness between said front and back sides thereof for at least about one-half of the overall length of said sidewalk.

8. The head as set forth in claim 7 wherein said sidewalks are of uniform thickness between said front and back sides for about three-quarters of the overall length of said sidewalls.

9. The head set forth in claim 1 wherein said lip has an exterior surface remote from said base that defines a ground contact plane at an angle of at least 40° to said axis.

10. The head set forth in claim 9 wherein said ground contact plane is at an angle of not greater than 65° to said axis.

11. The head set forth in claim 10 wherein said ground contact plane is at an angle of 45° to said axis.

12. The head set forth in claim 11 wherein said lip has an interior surface that slopes from said back side to said front side at an angle of 47° to said axis.

13. The head set forth in claim 9 wherein said lip is of curved construction outwardly of said handle between said sidewalk.

14. The head set forth in claim 13 wherein said lip has a substantially uniform radius of curvature between said sidewalls.

15. The head set forth in claim 14 wherein radius of curvature of said lip at said back side of said lip is greater than radius of curvature of said lip at said front side of said lip.

16. The head set forth in claim 15 wherein said radius of curvature of said lip at said front side of said lip is at least four inches.

17. The head set forth in claim 1 wherein said concave interior surface of said base is at an obtuse angle to said axis.

18. The head set forth in claim 1 wherein said base has a concave shoulder at said back side that is recessed with respect to said concave interior surface of said base.

19. The head set forth in claim 18 wherein said net-securing means at said base are disposed in said shoulder.

20. The head set forth in claim 19 wherein said concave interior surface of said base is at an obtuse angle to said axis.

21. The head set forth in claim 20 wherein said obtuse angle is about 91°.

22. The head set forth in claim 21 wherein said shoulder is recessed more than one-quarter of an inch with respect to said curved interior surface of said base.

23. The head set forth in claim 1 wherein said handle-attachment means comprises a hollow socket projecting from said base for receiving the handle and strengthening ribs integral with said frame extending from said sidewalks to an end of said socket remote from said base.

24. The head set forth in claim 1 wherein said sidewalks are interiorly convex for about one-half of their lengths adjacent to said base and interiorly concave for about one-half of their lengths adjacent to said lip.

25. A lacrosse head that comprises:

an open frame having a base with a concave interior surface defusing a ball rest, a pair of sidewalk diverging from said base and a lip interconnecting said sidewalk remotely of said base, means carried by said frame for securing a lacrosse net along a back side of said frame, leaving the front side of said frame open for receiving a lacrosse ball, and means exteriorly projecting from said base for attachment of a handle so as to define a handle/head axis, said lip having an exterior surface remote from said base that defines a ground contact plant at an angle of at least 40° to said axis, said front side of said frame at said base adjacent to said attachment means defining a plane parallel to said axis, both said front side and said back side of said sidewalk curving away from said plane and then back toward said plane from said base toward said lip so as to impart a curved scoop-like geometry to said head when viewed in side elevation.

26. The head set forth in claim 25 wherein said ground contact plane is at an angle of not greater than 65° to said axis.

27. The head sat forth in claim 26 wherein said ground contact plane is at an angle of 45° to said axis.

28. The head set forth in claims 25 wherein said lip has an interior surface that slopes from said back side to said front side at an angle of 47° to said axis.

29. The head set forth in claim 25 wherein said lip is of curved construction outwardly of said handle between said sidewalls.

30. The head set forth in claim 29 wherein said lip has a substantially uniform radius of curvature between said sidewalls.

31. The head set forth in claim 30 wherein radius of curvature of said lip at said back side is greater than radius of curvature of said lip at said front side.

32. The head set forth in claim 31 wherein said radius of curvature of said lip at said front side is at least four inches.

33. The head set forth in claim 25 wherein both said front side and said back side of said sidewalls have a maximum spacing from said plane at about the midpoint of said sidewalls between said base and said lip.

34. The head set forth in claim 33 wherein said front side and said back side of said sidewalls each curve at substantially constant radius throughout at least one-half of their lengths between said base and said lip.

35. The head set forth in claim 34 wherein curvature of said sidewalls and lengths of said sidewalls are such that said back sides of said sidewalls return at said lip to a spacing from said plane equal to or less than spacing of said back sides from said plane adjacent to said base.

36. The head set forth in claim 35 wherein said sidewalls are of uniform thickness between said front and back sides thereof for at least about one-half of the overall length of said sidewalls.

37. The head set forth in claim 36 wherein said sidewalls are of uniform thickness between said front and back sides for about three-quarters of the overall length of said sidewalls.

38. The head set forth in claim 25 wherein said base has a concave shoulder at said back side that is recessed with respect to said concave interior surface of said base.

39. The head set forth in claim 38 wherein said net-securing means at said base are disposed in said shoulder.

40. The head set forth in claim 39 wherein said concave interior surface of said base is at an obtuse angle to said axis.

41. The head set forth in claim 40 wherein said obtuse angle is about 91°.

42. A lacrosse head that comprises:

an open frame having a base with a concave interior surface defining a ball rest, a pair of sidewalls diverging from said base and a lip interconnecting said sidewalls remotely of said base, means carried by said frame for securing a lacrosse net along a back side of said frame, leaving the front side of said frame open for receiving lacrosse balls, and means exteriorly projecting from said base for attachment of a handle so as to define a handle/head axis, said base having a concave shoulder at said back side that is recessed with respect to said concave interior surface of said base, said net-securing means at said base being disposed in said shoulder.

43. The head set forth in claim 42 wherein said concave interior surface of said base is at an obtuse angle to said axis.

44. The head set forth in claim 43 wherein said obtuse angle is about 91°.

45. The head set forth in claim 44 wherein said shoulder is recessed more than one-quarter of an inch with respect to said curved interior surface of said base.

46. The head set forth in claim 42 wherein said front side of said frame at said base adjacent to said attachment means defines a plane parallel to said axis, and wherein both said front side and said back side of said sidewalls curve away from said plane and then back toward said plane from said base toward said lip so as to impart a curved scoop-like geometry to said head when viewed in side elevation.

47. The head set forth in claim 46 wherein both said front side and said back side of said sidewalls have a maximum-spacing from said plane at about the midpoint of said sidewalls between said base and said lip.

48. The head set forth in claim 47 wherein said front side and said back side of said sidewalls each curve at substantially constant radius throughout at least one-half of their lengths between said base and said lip.

49. The head set forth in claim 48 wherein curvature of said sidewalls and length of said sidewalls are such that said back side of said sidewalls returns at said lip to a spacing from said plane equal to or less than spacing of said back side from said plane adjacent to said base.

50. The head set forth in claim 42 wherein said lip has an exterior surface remote from said base that defines a ground contact plane at an angle of at least 40° to said axis.

51. The head set forth in claim 50 wherein said ground contact plane is at an angle of not greater than 65° to said axis.

52. The head set forth in claim 51 wherein said ground contact plane is at an angle of 45° to said axis.

53. The head set forth in claim 52 wherein said lip has an interior surface that slopes from said back side to said front side at an angle of 47° to said axis.

54. The head set forth in claim 50 wherein said lip is of curved construction outwardly of said length between said sidewalls.

55. The head set forth in claim 54 wherein said lip has a substantially uniform radius of curvature between said sidewalls.

56. The head set forth in claim 55 wherein said radius of curvature of said lip at said back side is greater than radius of curvature of said lip at said front side.

57. The head set forth in claim 56 wherein said radius of curvature of said lip at said front side is at least four inches.

*58. A lacrosse head, comprising:*

*an open frame having a base with a concave interior surface defining a ball rest, a pair of sidewalls diverging from said base and a lip interconnecting said sidewalls remotely of said base;*

*a means carried by said frame for securing a lacrosse net along a back side of said frame leaving an opposing front side of said frame open for receiving lacrosse balls; and*

*a projection extending exteriorly from said base for attachment of a handle so as to define a handle/head axis, said front side of said frame at said base adjacent to said attachment means defining a plane parallel to said axis;*

*said front side of said sidewalls curving generally downwardly to a point below said plane beginning adjacent said base so as to impart a curved geometry when viewed in side elevation.*

*59. The head set forth in claim 58 wherein said back side of said sidewalls curves away from said plane from said base toward said lip so as to impart a curved geometry when viewed in side elevation.*

*60. The head set forth in claim 59 wherein said front side and said back side of said sidewalls curve back toward said plane toward said lip when viewed in side elevation.*

*61. The head set forth in claim 59, wherein said front and said back side of said sidewalls each curve at substantially constant radius away from said base toward said lip.*

*62. The head set forth in claim 61, wherein said sidewalls are of uniform thickness between said front and back sides thereof for about one-half of the overall length of said sidewalls.*

*63. The head set forth in claim 58 wherein said lip has an exterior surface remote from said base that defines a ground contact plane at an angle of at least 40° to said axis.*

*64. The head set forth in claim 58, wherein said base has a concave shoulder at said back side that is recessed with respect to said concave interior surface of said base.*

*65. The head set forth in claim 64, wherein said net-securing means at said base are disposed in said shoulder.*

*66. The head set forth in claim 65, wherein said concave interior surface of said base is at an obtuse angle to said axis.*

*67. The head set forth in claim 66, wherein said shoulder is recessed at least one-quarter of an inch with respect to said curved interior surface of said base.*

*68. The head set forth in claim 58, wherein said front side of said sidewalls curve generally upward remote from said base.*

*69. The head set forth in claim 58, wherein each of said sidewalls includes at least one opening formed therein that is not intended for use as said net securing means.*

*70. A head for a lacrosse stick comprising:*

*an open frame having a base with a concave interior surface defining a ball rest, a pair of sidewalls diverging from said base and a lip interconnecting said sidewalls remotely of said base;*

*means carried by said frame for securing a lacrosse net along a back side of said frame, leaving the front side of said frame open for receiving a lacrosse ball; and*

*a projection extending from said base for attachment of a handle so as to define a handle/head axis;*

*said base having a front side edge adjacent said projection for defining a plane that is offset from and parallel to said handle/head axis;*

*at least a portion of said front side of said sidewalls, located within a half of the lengths adjacent said base, being offset from said plane and at least a portion of said back side of said sidewalls located within the other half of their lengths remote from said base curving upward toward said front side of said sidewalls.*

*71. The head set forth in claim 70 wherein said sidewalls are of uniform thickness between said front and back sides thereof for about one-half of the overall length.*

*72. The head set forth in claim 70 wherein said lip has an exterior surface remote from said base that defines a ground contact plane at an angle of at least* 40° to said axis.

*73. The head set forth in claim 70 wherein said base has a concave shoulder at said back side that is recessed with respect to said concave interior surface of said base.*

*74. The head set forth in claim 70 wherein said net-securing means at said base are disposed in said shoulder.*

*75. The head set forth in claim 74 wherein said concave interior surface of said base is at an obtuse angle to said axis.*

*76. The head set forth in claim 75 wherein said shoulder is recessed at least one-quarter of an inch with respect to said curved interior surface of said base.*

*77. The head set forth in claim 70, wherein said front side of said sidewalls extend generally downward within said half of the lengths adjacent said base.*

*78. The head set forth in claim 70, wherein said front side of said sidewalls extend generally upward within said half of their lengths remote from said base.*

*79. The head set forth in claim 78, wherein said front side of said sidewalls curve generally downward within said half of the lengths adjacent said base.*

*80. The head set forth is claim 79, wherein said front side of said sidewalls curve generally upward within said half of their lengths remote from said base.*

*81. A head for a lacrosse stick, comprising:*

*an open frame having a base with a concave interior surface defining a ball rest, a pair of sidewalls extending from said base, and a lip interconnecting said sidewalls remotely of said base;*

*a plurality of apertures carried by said frame for securing a lacrosse net along a back side of said frame, leaving the front side of said frame open for receiving a lacrosse ball; and*

*a projection extending from said base for attachment of a handle so as to define a handle/head axis, said projection having an upper surface which defines a plane parallel to said handle/head axis;*

*at least a portion of said front side of said sidewalls, located adjacent said base, being offset below said plane.*

*82. The head set forth in claim 75, wherein each of said sidewalls further includes at least one opening formed therein that is not intended for attachment of said lacrosse net.*

*83. The head set forth in claim 82, wherein said front side of said sidewalls extend generally downwardly beginning adjacent said base.*

*84. The head set forth in claim 82, wherein said front side of said sidewalls curve generally downwardly beginning adjacent said base.*

*85. A head for a lacrosse stick comprising:*

*an open frame having a base with a concave interior surface defining a ball rest, a pair of sidewalls extending from said base, and a lip interconnecting said sidewalls remotely of said base;*

*a plurality of apertures carried by said frame for securing a lacrosse net along a back side of said frame, leaving the front side of said frame open for receiving a lacrosse ball;*

*a socket extending from said base for attachment of a handle so as to define a handle/head axis, said socket having an upper surface defining a plane parallel to said handle/head axis;*

*said front side of said sidewalls, beginning adjacent said base, curving downwardly to a point below said plane so as to impart a curved geometry when viewed in side elevation.*

*86. The head set forth in claim 85, wherein each of said sidewalls includes at least one opening formed therein that is not intended for attachment of said lacrosse net.*

*87. The head set forth in claim 86, wherein said front side of said sidewalls curve generally upwardly toward said plane remote from said base.*

*88. A head for lacrosse stick comprising:*

*an open frame having a base with a concave interior surface defining a ball rest, a pair of sidewalls diverging from said base and a lip interconnecting said sidewalls remotely of said base;*

*a plurality of apertures carried by said frame for securing a lacrosse net along a back side of said frame, leaving*

*the front side of said frame open for receiving a lacrosse ball;*

*a socket extending from said base for attachment of a handle so as to define a handle/head axis;*

*said base having a front side edge adjacent said socket for defining a plane that is offset from and parallel to said handle/head axis;*

*said front side of said sidewalls curving downwardly beginning adjacent said base to a point below said plane and above said handle/head axis.*

*89. The head set forth in claim 88, wherein each of said sidewalls includes at least one opening formed therein that is not intended for attachment of said lacrosse net.*

*90. The head set forth in claim 89, wherein said front side of said sidewalls curve generally upwardly toward said plane remote from said base.*

*91. A head for a lacrosse stick, comprising:*

*an open frame having a base with a concave interior surface defining a ball rest, a pair of sidewalls diverging from said base and a lip interconnecting said sidewalls remotely of said base;*

*a plurality of apertures carried by said frame for securing a lacrosse net along a back side of said frame, leaving the front side of said frame open for receiving a lacrosse ball;*

*a socket extending from said base for attachment of a handle so as to define a handle/head axis, said socket having an upper surface defining a plane parallel to said handle/head axis;*

*at least a portion of said front side of said sidewalls, located within a half of the lengths adjacent said base, being offset below said plane and at least a portion of said back side of said sidewalls located within the other half of their lengths remote from said base extending upwardly toward said front side of said sidewalls.*

*92. The head of claim 78, wherein said portion of said back side of said sidewall curves generally upwardly toward said front side of said sidewalls.*

*93. The head of claim 78, wherein said portion of said front side of said sidewall curves generally downwardly.*

*94. The head of claim 78, wherein said offset portion of said front side of said sidewall is located adjacent said base.*

*95. The head set forth in claim 91, wherein each of said sidewalls includes at least one opening formed therein that is not intended for attachment of said lacrosse net.*

*96. A lacrosse head comprising:*

*an open frame having a base with a concave interior surface defining a ball rest;*

*a pair of sidewalls diverging from said base and a lip interconnecting said sidewalls remotely of said base;*

*means carried by said frame for securing a lacrosse net along a back side of said frame, leaving an opposing front side of said frame open for receiving lacrosse balls;*

*a socket exteriorly projecting from said base for attachment of a handle so as to define a handle/head axis, said front side of said frame at said base adjacent to said socket defining a plane parallel to said axis; and*

*said front side of each of said sidewalls extending downward away from said plane and then back toward said plane from said base toward said lip.*

*97. The head set forth in claim 96, wherein each of said sidewalls includes at least one opening formed therein that is not intended for attachment of said lacrosse net.*

*98. A lacrosse head comprising:*

*an open frame having a base with a concave interior surface defining a ball rest;*

*a pair of sidewalls diverging from said base and a lip interconnecting said sidewalk remotely of said base;*

*a plurality of apertures carried by said frame for securing a lacrosse net along a bottom side of said frame, leaving a top side of said frame open for receiving a lacrosse ball;*

*a socket exteriorly projecting from said base for attachment of a handle so as to define a handle/head axis, said base having a top edge adjacent said socket for defining a plane parallel to said handle/head axis; and*

*said front side of said sidewalls curving generally downwardly to a point below said plane, said curving beginning adjacent said base.*

*99. The head set forth in claim 98, wherein each of said sidewalls includes at least one opening formed therein that is not intended for attachment of said lacrosse net.*

*100. A head for a lacrosse stick, comprising:*

*an open frame having a base with a concave interior surface defining a ball rest;*

*a pair of sidewalls extending from said base, and a lip interconnecting said sidewalls remotely of said base;*

*a plurality of apertures carried by said frame for securing a lacrosse net along a back side of said frame, leaving the front side of said frame open for receiving a lacrosse ball; and*

*a projection extending from said base for attachment of a handle so as to define a handle/head axis, said projection having an upper surface which defines a plane parallel to said handle/head axis;*

*said front side of each of said sidewalls extending downward beginning adjacent said base to point below said plane.*

*101. The head set forth in claim 100, wherein each of said sidewalls includes at least one opening formed therein that is not intended for attachment of said lacrosse net.*

* * * * *

UNITED STATES PATENT AND TRADEMARK OFFICE

CERTIFICATE OF CORRECTION

PATENT NO. : RE 38,216 E
APPLICATION NO. : 09/174804
DATED : August 12, 2003
INVENTOR(S) : David Morrow and Philip Naumburg It is certified that error appears in the above-identified patent and that said Letters Patent is hereby corrected as shown below:

Please replace claim 1, column 5, lines 27-44, to read as follows:

1. A lacrosse head that comprises:
an open frame having a base with a concave interior surface defining a ball rest, a pair of sidewalls diverging from said base and a lip interconnecting said sidewalls remotely of said base,
means carried by said frame for securing a lacrosse net along a back side of said frame, leaving an opposing front side of said frame open for receiving lacrosse balls, and
means exteriorly projecting from said base for attachment of a handle so as to define a handle/head axis, said front side of said frame at said base adjacent to said attachment means defining a plane parallel to said axis,
both said front said and said back side of said sidewalls curving away from said plane and then back toward said plane from said base toward said lip so as to impart a curved scoop-like geometry to said head when viewed in side elevation.

Please replace claim 2, column 5, lines 45-48, to read as follows:

2. The head set forth in claim 1 wherein both said front side and said back side of said sidewalls have a maximum spacing from said plane at about the midpoint of said sidewalls between said base and said lip.

Please replace claim 3, column 5, lines 49-52, to read as follows:

3. The head set forth in claim 2 wherein said front side and said back side of said sidewalls each curve at substantially constant radius throughout at least one-half of their lengths between said base and said lip.

Please replace claim 4, column 5, lines 53-57, to read as follows:

4. The head set forth in claim 3 wherein curvature of said sidewalls and length of said sidewalls are such that said back sides of said sidewalls return at said lip to a spacing from said plane equal to or less than spacing of said back sides from said plane adjacent to said base.

UNITED STATES PATENT AND TRADEMARK OFFICE

CERTIFICATE OF CORRECTION

PATENT NO. : RE 38,216 E
APPLICATION NO. : 09/174804
DATED : August 12, 2003
INVENTOR(S) : David Morrow and Philip Naumburg It is certified that error appears in the above-identified patent and that said Letters Patent is hereby corrected as shown below:

Please replace claim 7, column 5, lines 63-66, to read as follows:

7. The head set forth in claim 3 wherein said sidewalls are of uniform thickness between said front and back sides thereof for at least about one-half of the overall length of said sidewalls.

Please replace claim 8, column 5, lines 67-70, to read as follows:

8. The head as set forth in claim 7 wherein said sidewalls are of uniform thickness between said front and back sides for about three-quarters of the overall length of said sidewalls.

Please replace claim 23, column 6, lines 39-43, to read as follows:

23. The head set forth in claim 1 wherein said handle-attachment means comprises a hollow socket projecting from said base for receiving the handle and strengthening ribs integral with said frame extending from said sidewalls to an end of said socket remote from said base.

Please replace claim 24, column 6, lines 44-47, to read as follows:

24. The head set forth in claim 1 wherein said sidewalls are interiorly convex for about one-half of their lengths adjacent to said base and interiorly concave for about one-half of their lengths adjacent to said lip.

UNITED STATES PATENT AND TRADEMARK OFFICE

CERTIFICATE OF CORRECTION

PATENT NO. : RE 38,216 E
APPLICATION NO. : 09/174804
DATED : August 12, 2003
INVENTOR(S) : David Morrow and Philip Naumburg It is certified that error appears in the above-identified patent and that said Letters Patent is hereby corrected as shown below:

Please replace claim 25, column 6, lines 48-66, to read as follows:

25. A lacrosse head that comprises:

an open frame having a base with a concave interior surface defusing a ball rest, a pair of sidewalls diverging from said base and a lip interconnecting said sidewalls remotely of said base;

means carried by said frame for securing a lacrosse net along a back side of said frame, leaving the front side of said frame open for receiving a lacrosse ball, and means exteriorly projecting from said base for attachment of a handle so as to define a handle/head axis, said lip having an exterior surface remote from said base that defines a ground contact plant at an angle of at least 40° to said axis, said front side of said frame at said base adjacent to said attachment means defining a plane parallel to said axis, both said front side and said back side of said sidewalls curving away from said plane and then back toward said plane from said base toward said lip so as to impart a curved scoop-like geometry to said head when viewed in side elevation.

Signed and Sealed this

Twelfth Day of September, 2006

JON W. DUDAS
*Director of the United States Patent and Trademark Office*